United States Patent Office 3,341,343
Patented Sept. 12, 1967

3,341,343
HYDROPHOBIC POLYMERIC RESIN CONTAINING PHOSPHATE ESTER ANTISTATIC AGENT AND PROCESS FOR PRODUCING ANTISTATIC PROPERTIES
John P. G. Beiswanger, Easton, Pa., and James J. Robinson, Teaneck, N.J., assignors to General Aniline & Film Corporation, New York, N.Y., a corporation of Delaware
No Drawing. Filed Nov. 12, 1963, Ser. No. 324,600
15 Claims. (Cl. 106—177)

This invention relates to antistatic polymer compositions, and more particularly to hydrophobic polymer compositions containing minor amounts of phosphate esters dispersed in the compositions to provide improved antistatic properties.

It is well known that hydrophobic polymers tend to accumulate electrostatic charges on their surfaces due to the poor electrical conductivity of the surface. This accumulation of electrostatic charges generally occurs during processing of these polymeric materials wherein repeated friction of the materials with other materials in process or the process equipment causes electrostatic charges to accumulate. These electrostatic charges often interfere with processing operations. There is always danger of fire when these charges are discharged accidentally. These charges also cause excessive dust pickup when the articles are stored and are troublesome and annoying when the polymeric materials in the form of useful articles are put into service. There is always the possibility that electrostatic charges may accumulate on the finished article and cause injury, annoyance or fire when they are accidentally discharged.

The general idea of treating hydrophobic polymeric materials with antistatic agents is old. A common method of improving the electrostatic qualities of polymers in the prior art has been to impregnate the surface of the article by padding from a dilute dispersion or solution of the desired antistatic agent. Although the padding may be accomplished in a matter of seconds, the treated article must be dried and stored. Drying of the treated article to remove the solvent is an added step and may create further processing problems particularly if the solvent is flammable. Furthermore, the padding process only provides surface protection and at best gives a thin layer of antistatic material on the surface of the article. This thin layer is often removed in part or wholly when the finished article is handled or used. The result is that this type of treatment of articles formed from polymeric materials with antistatic agents is at best only temporary.

The objects of the present invention are to provide hydrophobic polymer compositions of matter with improved antistatic properties for use in the manufacture of useful articles of commerce; to provide polymeric compositions of matter having more peranment antistatic properties; to disperse the antistatic agent in the polymeric composition; to provide a process for dispersing antistatic agents in hydrophobic polymeric compositions of matter; to provide improved antistatic agents for hydrophobic polymeric compositions of matter; and to provide dispersions of antistatic agents in hydrophobic polymers wherein the antistatic agent in the polymer migrates to the surface of the polymer to maintain a protective coating of antistatic agent on the surface of the polymer.

The attainment of the above objects of this invention is made possible by our discovery that the antistatic properties of hydrophobic polymeric materials may be improved by use of an antistatic composition of matter comprising:

(A) a minor amount of a phosphate ester selected from the group consisting of mono-, diesters, triesters and mixtures thereof of phosphoric acid with a nonionic surfactant condensation product of an organic compound containing at least 6 carbon atoms and containing a reactive hydrogen with at least 1 mole of alkylene oxide; and (B) a major amount of hydrophobic polymeric resin wherein the phosphate ester is dispersed in the polymeric resin.

In preparing hydrophobic polymeric compositions of matter in accordance with this invention, the desired amount of phosphate ester is compounded with the polymer by either mixing the ester either in the molten polymer, in solutions of the polymer or by mixing the ester with the monomer and in situ polymerization to provide uniform dispersion of the antistatic agent throughout the polymer. In this way, the ester is so dispersed in the polymer that a high degree of permanence of antistatic properties is obtained by the gradual migration of the antistatic agent to the surface of the polymer to maintain a protective coating of antistatic agent on the polymer surface. The compositions may be used in various plastic fabricating processes such as extruding, vacuum forming, blow molding, injection molding, transfer molding, dope casting or the like. Pigmented and "filled" polymers may be used in this invention since these antistatic agents do not appear to lose their activity in the presence of known polymer additives.

Although the reasons for the superiority of these antistatic polymeric compositions of matter prepared by dispersing the antistatic agent in the polymer over those prepared by surface application of the antistatic agent to the polymer surface are not fully understood, it is felt that the dispersions are more effective because the phosphate ester antistatic agents are somewhat incompatible in the polymer and migrate to the surface of the polymer to provide constant replacement of the antistatic agent on the surface and maintain higher concentrations of antistatic agent on the polymer surface than were obtained by the surface coating methods employed in the prior art. Although this theory may provide a partial explanation for the superiority of the compositions of matter disclosed in this invention, we do not propose to be limited to any particular theory as to the mode or action by which these compositions of matter provide improved antistatic properties.

As to the range of concentration of antistatic agents which may be incorporated into the hydrophobic resin, from about 0.1 phr. (parts per hundred parts by weight of resin) to about 5.0 phr. may be used with the preferred range being between 0.2 and 2.5 phr. A preferred method for incorporating the phosphate ester in the hydrophobic polymer is to prepare a hot melt of the resin by heating the material to 180° C. The desired amount of phosphate ester is then blended with the molten resin. When the resin and antistatic agent are well mixed, the mixture is cooled and pressed into a film.

It will be understood by those skilled in the artt that the amount of antistatic agent required in any particular composition will vary within the above range depending on the type of phosphate ester chosen, the type of polymer used and conditions such as temperature, humidity or the like to which the polymer is exposed.

As for the chemical nature of the polymeric resin to be treated, this invention is operable on any hydrophobic resin which has a tendency to accumulate electrostatic charges.

Hydrophobic polymeric resins which may be used include polypropylene, polyvinyl chloride, polyvinyl fluoride, poly (chlorotrifluoroethylene), poly (tetrafluoroethylene), poly (vinylidene chloride), copolymers of vinyl chloride and vinyl acetate, copolymers of vinyl chloride and vinylidene chloride, polystyrene, polyethylene, cellulose acetate, cellulose triacetate, cellulose butyrate, cellulose nitrate, nylon, rubber hydrochloride, copolymers of acrylonitrile and styrene, terpolymers of acrylonitrile, butadiene and styrene, ethyl cellulose, poly (methyl methacrylate), polycarbonate, poly (ethyleneterephthalate), or the like. Mixtures of the above polymers may also be used.

We have discovered that phosphate esters derived from nonionic surfactants (surface active agents) are useful in the preparation of dispersions of compositions of matter of the above hydrophobic polymers having improved antistatic properties. Phosphate esters have a number of advantages in this particular application. Their hydrophobic and hydrophilic nature may be varied over a wide range by the selection of nonionic surfactants having varying amounts of alkylene oxides. This is a particular advantage when a dispersion of an antistatic agent having a specific hydrophobic-hydrophilic balance is desired. The compatibility of the mono and disubstituted esters may be further modified by conversion to their salts. This is a distinct advantage in the formulation of these compositions.

Phosphate esters useful in attaining the objects of this invention are selected from the group corresponding to the general formula:

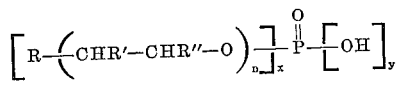

wherein R is a residue of an alkyl, alkaryl or aryl compound having at least 6 carbon atoms and a reactive hydrogen, e.g., the residue of an alkylphenol, aliphatic alcohol, fatty acid, fatty acid amide, fatty amine, rosin amine, alkyl sulfonamide, alkaryl sulfonamide, alkyl mercaptan or alkylaryl mercaptan, R' is hydrogen, an alkyl radical of from 1 to 10 carbon atoms or an aryl radical, R'' is hydrogen, an alkyl radical of 1 to 10 carbon atoms or an aryl radical, $n$ represents an integer of from 1 to 150, $x$ represents an integer of 1 to 3, $y$ represents an integer of from 0 to 2, and the sum of the integers of $x$ and $y$ is 3.

The phosphate esters of nonionic surfactants useful in attaining the objects of this invention which are herein contemplated are obtained from precursor nonionic surfactants selected from the group consisting of polyoxyalkylene ethers of organic compounds containing at least 6 carbon atoms and having a reactive hydrogen atom and condensed with at least 1 mole of alkylene oxide. The preferred number of alkylene oxide molecules reacted with the reactive hydrogen compound may vary from 1 to 150 moles and the number of carbon atoms in the alkylene oxide from 2 to 12.

Nonionic surfactants which may be employed in the manufacture of phosphate esters for use as antistatic agents in this invention include the polyoxyalkylated derivatives of alkylphenols and monohydric alcohols. Many of these products have been used extensively as nonionic surfactants and are well known in the art. Methods for their preparation and descriptions of their properties may be found in numerous patents and other publications. As examples of compounds containing a reactive hydrogen atom in addition to the above mentioned alcohols and phenols, compounds such as thiols, primary and secondary amines, and carboxylic and sulfonic acids and their amides may be used.

The amount of alkylene oxide which is reacted with the reactive hydrogen containing compound will depend primarily on the hydrophobic nature of the particular organic compound with which it is condensed. As a convenient rule of thumb an amount of alkylene oxide should be employed which will produce a condensation product containing from about 10 to 99.9% by weight of alkylene oxide. However, the amount of alkylene oxide required to obtain the desired antistatic properties as well as the desired hydrophobic-hydrophilic balance in an ester for a particular antistatic composition may be determined by preliminary tests or experiments.

A preferred group of nonionic surfactants which may be employed in the preparation of phosphate esters for use in this invention is the group derived from phenol and alkylphenol compounds. Members of this group (polyoxyalkylene oxide derivatives of phenolic compounds containing 1 or more alkyl substituents) are described in U.S. Patents 2,213,477 and 2,593,112. Among those preferred are the polyoxyalkylene derivatives of alkylphenols in which the total number of alkyl carbon atoms in the phenolic compound may vary from 1 to 36 carbon atoms. As examples of such alkylphenols there may be mentioned cresols, ethylphenols, propylphenol, butylphenols, amylphenols, hexylphenols, heptylphenols, octylphenols, nonylphenols, decylphenols, dodecylphenols, tetradecylphenols, octadecylphenols, amylcresols, nonylcresols, xylenols, diethylphenols, diamylphenols, dioctylphenols, dinonylphenols, dioctadecylphenols, their mixtures or their isomers.

Alkylphenols used in the preparation of these polyoxyalkylene derivatives may be obtained by alkylating phenols or cresols with olefins. Olefins containing from 2 to 36 carbon atoms may be used. These olefins may be either straight chain or branched chain olefins. In general, we prefer to use α-olefins. Such olefins may be obtained by a variety of known processes. For example, linear α-olefins of the type obtained by condensation of ethylene in the presence of Ziegler type catalysts may be used. Similar α-olefins obtained by wax cracking of natural or petroleum products may also be used. α-Olefins useful in the preparation of these alkylphenols may contain odd or even numbers of carbon atoms which may be an advantage in some applications. Mixtures of α-olefins having various ranges of carbon atoms such as $C_6$–$C_7$, $C_7$–$C_9$, $C_9$–$C_{11}$, $C_{11}$–$C_{15}$, $C_{15}$–$C_{20}$ and higher may be used. Olefins containing even number carbon atoms such as those derived from fats may also be used.

Particularly valuable alkylphenols for use in preparing polyoxyalkylene derivatives may be obtained by alkylating phenols with olefins containing from 8 to 18 carbon atoms such as octene, dodecene, pentadecene, octadecene, their isomers or their mixtures. These olefins may be obtained by polymerization of low molecular weight olefins such as propylene, butylene, amylene, their isomers or their mixtures. Phenol may also be used to prepare valuable polyalkylene oxide derivatives for use in this invention.

Alkylphenols such as m-pentadecylphenol may also be used. Among the substituted phenols which may be used to produce nonionic surfactants for conversion of phosphate esters to accomplish the objects of this invention, there may be mentioned alkylphenols such as tri-t-butylphenol, trioctylphenol, and o-phenyl phenol.

Another preferred group of nonionic surfactants which may be employed in the preparation of phosphate esters for use in compositions of matter embodied by this invention are the polyoxyalkylene derivatives of alcohols containing from 6 to 27 carbon atoms. These include the polyalkylene derivatives of hexyl alcohol, octyl alcohol, decyl alcohol, tetradecyl alcohol, hexadecyl alcohol, octadecyl alcohol, docosyl alcohol, heptacosyl alcohol, their isomers or their mixtures. The alcohols used in the manufacture of these nonionic surfactants may be produced by a variety of methods.

One of the common methods for synthesis of these alcohols is by hydrogenation of fatty acids or glycerides obtained from animal or vegetable oils and waxes such as coconut oil, castor oil, tall oil, peanut oil, menhaden oil, sperm oil, tallow or the like. Such alcohols include lauryl alcohol, oleyl alcohol, stearyl alcohol, tallow alcohol, or the like.

Another method for preparation of alcohols useful in the synthesis of nonionic surfactants for this invention is the Oxo process. This process involves catalytic reaction of α-olefins with carbon monoxide and hydrogen under pressure to produce primary aliphatic alcohols having branched chains. α-Olefins of the type described above as well as olefin polymers such as dimers, trimers, tetramers and pentamers obtained by the polymerization of low molecular weight olefins may be used in the Oxo process. Such polyolefins include tripropylene, tetrapropylene, pentapropylene, propylene-isobutylene, triisobutylene, tetraisobutylene, their isomers or their mixtures. Alcohols are obtained from the Oxo process as mixtures and may be used as mixtures. Such Oxo alcohol mixtures include those of isooctyl alcohols, decyl alcohols, tridecyl alcohols, pentadecyl alcohols, heptadecyl alcohols, or higher alcohols. Specific alcohols may be separated from Oxo alcohol mixtures and used.

A third method for producing straight-chain, even carbon primary alcohols useful in the synthesis of nonionic surfactants is the Ziegler process described in Kirk-Othmer, "Encyclopedia of Chemical Technology," vol. 1, p. 540 (John Wiley, 2d ed. 1963). This process involves reaction of triethylaluminum with ethylene to produce higher trialkylaluminum compounds which are reacted with oxygen to form aluminum alkoxides which are hydrolyzed to primary alcohols. Such alcohols include hexyl alcohol, octyl alcohol, decyl alcohol, higher alcohols or mixtures of these alcohols.

In addition to the above described nonionic surfactants, polyoxyalkylene derivatives of organic mercapto compounds such as the products described in U.S. Patent 2,205,021 (the polyoxyalkylene derivatives of mercapto compounds such as dodecyl mercaptan, oleyl mercaptan, cetyl mercaptan, benzomercaptan, thiophenols or thionaphthols) may be used. Other useful polyalkylene derivatives include the carboxylic acid amides described in U.S. Patent 2,085,706 and the sulfonamides described in U.S. Patent 2,002,613. Polyalkylene derivatives of aliphatic organic compounds such as higher fatty acids and hydroxy fatty acids may also be used.

The following nonionic surfactants may be employed as reactants for the preparation of phosphate esters useful in this invention. In these illustrations of nonionic surfactants, E.O. means ethylene oxide, Pr. O. means propylene oxide, Bu. O. means 1,2-butylene oxide, Oc. O. means 1,2-octylene oxide, St. O. means styrene oxide, Dd. O. means 1,2-dodecylene oxide and the number preceding each of these formulas refers to the number of moles of the particular oxide thereof reacted with 1 mole of the given reactive hydrogen containing compound. Such nonionic surfactants include phenol+3 E.O., dioctadecylphenol+10 E.O., o-cresol+1 Pr. O+2 E.O., diisobutylphenol+30 E.O., diamylphenol+8 E.O., dodecylphenol+2 E.O., diamylphenol+1 St. O.+10 E.O., hexylphenol+4 Pr. O.+15 E.O., tall oil+18 E.O., castor oil+20 E.O., lauryl alcohol+1 Pr. O.+4 E.O., isooctyl alcohol (Oxo alcohols)+5 E.O., tridecyl alcohol (Oxo alcohol)+9 E.O., tallow alcohol+30 E.O., stearyl alcohol+20 E.O., polypropylene glycol (30 oxypropylene units)+10 E.O., 4-t-butylphenol+1 Oc. O.+18 E.O., phenol+1 Dd. O.+12 E.O., stearyl alcohol+140 E.O., octadecyl alcohol (Ziegler process)+150 E.O. or oleyl alcohol+7 E.O.

Phosphate esters derived from the above nonionic surfactants may be prepared by a variety of methods. Numerous methods for the preparation of these esters may be found in patents and other publications. Various phosphation agents such as phosphorus pentoxide, phosphorus oxychloride, orthophosphoric acid, polyphosphoric acid or the like may also be used.

Generally, we prefer to use the method as disclosed and claimed in U.S. Patent 3,004,056 by Nunn and Hesse and in U.S. Patent 3,004,057 by Nunn. Briefly, this method involves reaction of 1 mole of phosphorus pentoxide ($P_2O_5$) with from 2 to 4.5 moles of nonionic surfactant under substantially anhydrous conditions at temperatures below 110° C. The method gives mixtures of mono- and di-substituted phosphate esters.

Another useful method for producing mono- and di-substituted phosphate esters is that disclosed in the co-pending application of Nehmsmann, Nunn and Schenck, Serial Number 275,222 filed April 24, 1963, now U.S. Patent 3,277,217. This method involves oxidation of mono- and di-substituted phosphites to the corresponding phosphates. In this method the phosphite is oxidized to a phosphate by the use of elemental oxygen in the presence of a small amount of peroxide as a catalyst at temperatures between about 25 and 200° C. The method may be used to produce monosubstituted, disubstituted, trisubstituted or mixtures of these substituted phosphate esters in high states of purity as well as mixtures of these esters in which the concentration of each of the types of esters may be maintained within close limits.

A third method for preparing phosphate esters useful in the present invention is that disclosed in the copending application of Papalos, Ser. No. 243,721, filed Dec. 11, 1962 and of common ownership. In this method from 1 to 3 moles of $P_2O_5$ are reacted with 1 mole of nonionic surfactant in the presence of a small amount of water or a mineral acid at temperatures from 120° to 200° C. This method favors the formation of mono-substituted phosphate esters.

Another method involves the reaction of phosphorus oxychloride $POCl_3$ with nonionic surfactants to form mixtures of mono-, di- and tri-substituted phosphate esters. For example, phosphate ester mixtures containing 18–43% of mono and diesters, 30–60% triester and 12–31% nonionic obtained by the reaction of from 1–3 moles of nonionic surfactant with 1 mole of $POC_3$ have been found useful as antistatic agents.

The above described mono and disubstituted phosphate esters may be used in this invention in their free and unneutralized form or in the form of partially or completely neutralized salts containing as cations, alkali metals, alkaline earth metals, other metals, ammonia or organic amines. It is to be understood that such salts are to be considered as the equivalents of the phosphate esters in their free form. As examples of suitable cations for neutralizing the mono and disubstituted phosphate esters, there may be mentioned sodium, potassium, lithium, calcium, strontium, barium, magnesium, iron, tin, cadmium, aluminum, antimony, chromium, manganese, mercury, nickel, ammonia or organic amines such as the mono, di, and trimethylamines, ethylamines, propylamines, butylamines, hexylamines, octylamines, decylamines, laurylamines, stearylamines, ethanolamines, propanolamines, butanolamines, hexanolamines, cyclohexylamines, phenylamines, pyridine, morpholine or the like.

The general method for evaluation of phosphate esters for use as antistatic agents in this invention is as follows: the phosphate ester was compounded in the specific polymeric material as a hot melt. The compounded polymer was then cooled and a representative portion of the compounded material was pressed into a film by means of temperature and pressure. A sample of this film was rubbed 20 times on each side with a new clean scoured nylon cloth to produce an initial induced electrostatic charge on the surface of the film. The charged film was then suspended from a glass insulator into a Leyden jar so that the film hung free in the jar and did not touch the walls of the jar. The voltage of the charge induced by the film on the jar was measured initially, after one half hour and after one hour periods. These measurements gave the initial charge and the rate of voltage loss or the decay rate.

A variation of the above general method of compounding phosphate esters in specific polymeric materials is to prepare a dope by dissolving the polymer in a solvent. The phosphate ester is then incorporated into the dope at the desired concentration. A film is then prepared from the dope by casting on a clean glass with a doctor blade at the desired wet film thickness. The film is then dried, removed from the glass and cut into the desired sample size. The sample of the film is then rubbed with nylon cloth to produce an initial induced electrostatic charge on film. The charge is then measured in the manner described above. This method was used in the preparation of cellulose ester films.

The following examples are only illustrative of the present invention and are not to be regarded as limitative. It will be understood that all parts, percentages and proportions referred to herein and in the appended claims are by weight unless otherwise indicated.

*Example I*

The phosphate esters shown in Table I were compounded in polypropylene mixes as hot melts at 180° C. The concentration of phosphate ester used in these compounded polymers is shown in Table I as phr. (parts per hundred parts of resin). The compounded polymer was then cooled and a representative portion of the compounded material pressed into a film by means of temperature and pressure.

A sample of film having the dimensions of 4-inch x 4-inch x 15 mils was rubbed 20 times on each side with a new clean scoured nylon cloth to produce an initial induced electrostatic charge on the film. The charged film was then suspended from a glass insulator into a Leyden jar so that the film hung free in the jar and did not touch the walls of the jar. The voltage of the charge induced on the jar was measured initially, after ½ hour and after 1 hour. The results of these measurements are shown in Table I as voltage. A control sample containing no additive was prepared and evaluated in a similar manner.

The results given in the table show phosphate esters to be effective antistatic agents in polypropylene.

TABLE I.—ANTISTATIC PROPERTIES OF PHOSPHATE ESTERS COMPOUNDED IN POLYPROPYLENE MELTS AT 180° C.

| Phosphate Ester [1] of— | Phosphate Ester Concentration, phr. | Voltage | | |
|---|---|---|---|---|
| | | Initial | ½ Hr. | 1 Hr. |
| None (control) | 0.0 | 950 | 738 | 550 |
| Tridecyl Alcohol+2E.O. | 1.5 | 500 | 450 | 300 |
| Tridecyl Alcohol+4E.O. | 2.5 | 900 | 80 | 40 |
| Tridecyl Alcohol+6E.O. | 2.0 | 900 | 125 | 75 |
| Tallow Alcohol+4E.O. | 1.5 | 1,300 | 400 | 270 |
| Tallow Alcohol+6E.O. | 2.5 | 900 | 75 | 51 |
| Nonylphenol+2E.O. | 2.5 | 800 | 440 | 350 |
| Nonylphenol+4E.O. | 2.0 | 1,400 | 220 | 90 |
| Nonylphenol+6E.O. | 1.5 | 1,400 | 70 | 70 |
| Nonylphenol+50E.O.[2] | 0.4 | 1,000 | 600 | 460 |

[1] Esters prepared by method in U.S.P. 3,004,057 using 2.7 moles of nonionic per mole of P₂O₅ unless otherwise indicated.
[2] Sodium salt of ester prepared by the method in S.N. 243,721 filed December 11, 1962 using 1 mole of nonionic per 3 moles of P₂O₅.

*Example II*

The techniques as described in Example I were used to prepare polyvinylchloride films containing the phosphate esters at the concentrations shown in Table II. These films were prepared by compounding the phosphate esters in polyvinylchloride polymer as hot melts at 180° C. A comparison of the control and the formulated composition results given in Table II show the esters to be effective antistatic agents for polyvinylchloride polymers.

TABLE II.—ANTISTATIC PROPERTIES OF PHOSPHATE ESTERS COMPOUNDED IN POLYVINYLCHLORIDE MELTS AT 180° C.

| Phosphate Ester [1] of— | Phosphate Ester Concentration, phr. | Voltage | | |
|---|---|---|---|---|
| | | Initial | ½ Hr. | 1 Hr. |
| None (control) | 0.0 | 1,000 | 400 | 325 |
| Tridecyl Alcohol+2E.O. | 1.5 | 850 | 300 | 210 |
| Tridecyl Alcohol+4E.O. | 2.5 | 750 | 190 | 110 |
| Tridecyl Alcohol+6E.O. | 2.0 | 1,100 | 85 | 65 |
| Tallow Alcohol+2E.O. | 2.0 | 700 | 116 | 80 |
| Tallow Alcohol+4E.O. | 1.5 | 850 | 256 | 185 |
| Tallow Alcohol+6E.O. | 2.5 | 450 | 100 | 90 |
| Nonylphenol+4E.O. | 2.0 | 650 | 300 | 200 |
| Nonylphenol+6E.O. | 1.5 | 180 | 90 | 70 |

[1] Esters prepared by method in U.S.P. 3,004,057 using 2.7 moles of nonionic per mole of P₂O₅.

*Example III*

The techniques described in Example I were employed to prepare phosphate ester compounds in polystyrene melts at 180° C. Results obtained from voltage measurements on these mixtures are shown in Table III. The data given in Table III show these phosphate esters to be effective antistatic agents in polystyrene.

TABLE III.—ANTISTATIC PROPERTIES OF PHOSPHATE ESTERS COMPOUNDED IN POLYSTYRENE MELTS AT 180° C.

| Phosphate Ester [1] of— | Concentration, phr. | Voltage | | |
|---|---|---|---|---|
| | | Initial | ½ Hr. | 1 Hr. |
| None (control) | 0.0 | 1,000 | 800 | 750 |
| Tridecyl Alcohol+2E.O. | 1.5 | 600 | 250 | 120 |
| Tridecyl Alcohol+4E.O. | 2.5 | 260 | 60 | 30 |
| Tridecyl Alcohol+6E.O. | 2.0 | 280 | 40 | 25 |
| Tallow Alcohol+2E.O. | 2.0 | 610 | 230 | 140 |
| Tallow Alcohol+4E.O. | 1.5 | 360 | 160 | 40 |
| Tallow Alcohol+6E.O. | 2.5 | 140 | 65 | 42 |
| Nonylphenol+2E.O. | 2.5 | 250 | 100 | 75 |
| Nonylphenol+4E.O. | 2.0 | 230 | 155 | 120 |
| Nonylphenol+6E.O. | 1.5 | 320 | 80 | 30 |

[1] Esters prepared by method in U.S.P. 3,004,057 using 2.7 moles of nonionic per mole of P₂O₅.

*Example IV*

The techniques described in Example I were used to prepare phosphate ester in polyethylene compounds as melts at 130° C. Films were prepared from these phosphate ester-polyethylene compounds and their antistatic properties evaluated. Results of these tests are shown in Table IV. The data in Table IV show that these phosphate esters are effective antistatic agents for polyethylene.

TABLE IV.—ANTISTATIC PROPERTIES OF PHOSPHATE ESTERS COMPOUNDED IN LOW DENSITY POLYETHYLENE MELTS AT 130° C.

| Phosphate Ester [1] of— | Concentration, phr. | Voltage | | |
|---|---|---|---|---|
| | | Initial | ½ Hr. | 1 Hr. |
| None (control) | 0.0 | 580 | 450 | 440 |
| Tridecyl Alcohol+2E.O. | 0.2 | 400 | 81 | 65 |
| Tridecyl Alcohol+4E.O. | 1.0 | 130 | 50 | 26 |
| Tridecyl Alcohol+6E.O. | 0.6 | 140 | 70 | 58 |
| Tallow Alcohol+2E.O. | 0.6 | 480 | 60 | 35 |
| Tallow Alcohol+4E.O. | 0.2 | 600 | 51 | 51 |
| Tallow Alcohol+6E.O. | 1.0 | 290 | 76 | 59 |
| Nonylphenol+2E.O. | 1.0 | 800 | 310 | 220 |
| Nonylphenol+4E.O. | 0.6 | 750 | 240 | 200 |
| Nonylphenol+6E.O. | 0.2 | 700 | 380 | 300 |

[1] Esters prepared by method in U.S.P. 3,004,057 using 2.7 moles of nonionic per mole of P₂O₅.

*Example V*

The techniques described in Example I were employed to disperse the sodium salts of phosphate esters compounded in polystyrene melts at 180° C. Results of these tests are shown in Table V. The data in Table V show that these salts are also effective antistatic agents in polystyrene.

TABLE V.—ANTISTATIC PROPERTIES OF SODIUM SALT OF PHOSPHATE ESTERS COMPOUNDED IN POLYSTYRENE MELTS AT 180° C.

| Sodium Salt of Phosphate Ester [1] of— | Concentration, phr. | Voltage | | |
|---|---|---|---|---|
| | | Initial | ½ Hr. | 1 Hr. |
| None (control) | 0 | 1,300 | 750 | 600 |
| Tridecyl Alcohol+2E.O. | 1 | 950 | 400 | 330 |
| Tridecyl Alcohol+6E.O. | 1 | 320 | 210 | 170 |
| Tridecyl Alcohol+6E.O. | 2 | 400 | 50 | 15 |
| Tallow Alcohol+2E.O. | 2 | 500 | 90 | 52 |
| Tallow Alcohol+6E.O. | 1 | 600 | 520 | 380 |
| Tallow Alcohol+6E.O. | 2 | 140 | 70 | 51 |
| Nonylphenol+2E.O. | 1 | 550 | 500 | 500 |
| Nonylphenol+2E.O. | 2 | 270 | 160 | 140 |

[1] Esters prepared by method in U.S.P. 3,004,057 using 2.7 moles of nonionic per mole of P₂O₅.

Example VI

A "dope" containing 17% by weight of cellulose acetate in methyl vinyl ketone was prepared. The phosphate esters shown in Table VI were incorporated into aliquots of the dope at 1 to 5 phr. based on the amount of polymer in the dope. Films were prepared from the original (control) and formulated dopes by casting on clean glass from a 5″ doctor blade with a 38 mil setting. After drying, the clear and transparent films were removed from the glass, cut into 4 x 4″ sheets and evaluated by the procedure described in Example I. Results of these tests are given in Table VI and show the phosphate esters to be effective antistatic agents for cellulose acetate.

TABLE VI.—ANTISTATIC PROPERTIES OF PHOSPHATE ESTERS IN CAST CELLULOSE ACETATE FILMS

| Phosphate Ester [1] of— | Concentration, phr. | Voltage | | |
|---|---|---|---|---|
| | | Initial | ½ Hr. | 1 Hr. |
| None (control) | 0 | 1,000 | 575 | 450 |
| Tridecyl+6E.O. [2] | 1 | 1,000 | 325 | 200 |
| Nonylphenol+50E.O. [3] | 5 | 300 | 110 | 90 |

[1] Esters prepared by method in U.S.P. 3,004,057 using 2.7 moles of nonionic per mole of $P_2O_5$ unless otherwise indicated.
[2] Sodium salt.
[3] Ester prepared by method in S.N. 243,721 filed December 11, 1962 using 1 mole of nonionic per 3 moles of $P_2O_5$.

Example VII

The techniques described in Example I were employed to disperse the phosphate esters shown in Table VII in high density polyethylene at 1 phr. Results of these tests are shown in the table. All results are given as volts measured at 72° F. and 40% R.H. (relative humidity).

TABLE VII.—ANTISTATIC PROPERTIES OF 1 phr. OF PHOSPHATE ESTERS IN HIGH DENSITY POLYETHYLENE

| Phosphate Ester [1] of— | Voltage After— | | | | |
|---|---|---|---|---|---|
| | 0 min. | 30 min. | 60 min. | 90 min. | 120 min. |
| None (control) | 900 | 700 | 600 | 500 | 400 |
| Tridecyl Alcohol+10E.O. | 800 | 20 | 15 | 10 | 10 |
| Nonylphenol+10E.O. | 200 | 55 | 35 | 25 | 16 |
| Lauryl Alcohol+4E.O. | 300 | 20 | 10 | 10 | 10 |
| Tridecyl Alcohol+10E.O. [2] | 160 | 160 | 120 | 120 | 105 |
| Tridecyl Alcohol+15E.O. | 700 | 80 | 60 | 40 | 35 |

[1] Esters prepared by method in U.S.P. 3,004,057 using 2.7 moles of nonionic per mole of $P_2O_5$.
[2] Triethylamine salt.

Example VIII

The techniques described in Example VII were employed to disperse the phosphate esters shown in Table VIII in a copolymer of vinyl chloride and vinyl acetate. This copolymer had a vinyl chloride/vinyl acetate ratio of 85/15. Results of these tests are shown in Table VIII. All results are given as volts measured at 72° F. and 40% R.H. (relative humidity). These data also show phosphate esters to be effective antistatic agents.

TABLE VIII.—ANTISTATIC PROPERTIES OF 0.5 phr. OF PHOSPHATE ESTERS IN A COPOLYMER OF VINYL CHLORIDE AND VINYL ACETATE

| Phosphate Ester [1] of— | Voltage After— | | | | |
|---|---|---|---|---|---|
| | 0 min. | 30 min. | 60 min. | 90 min. | 120 min. |
| None (control) | 920 | 500 | 400 | 350 | 300 |
| Tridecyl Alcohol+10E.O. | 700 | 120 | 75 | 35 | 20 |

[1] Ester prepared by method in U.S.P. 3,004,057 using 2.7 moles of nonionic per mole of $P_2O_5$.

Other phosphate esters which may be incorporated in resins as antistatic agents include the phosphate esters of lauryl alcohol+4E.O., prepared by reaction with phosphorus oxychloride, the phosphate esters of dinonylphenol+9E.O. prepared by reaction with $P_2O_5$, the phosphate esters of tridecyl alcohol+50E.O. prepared by reaction with $P_2O_5$, the phosphate esters of lauryl alcohol (Ziegler process)+20E.O. prepared by reaction with $P_2O_5$, the phosphate esters of oleyl alcohol+7E.O. prepared by the reaction with phosphorus oxychloride and the like.

This invention has been disclosed with respect to certain embodiments. Various modifications and variations thereof will become obvious to persons skilled in the art. It is to be understood that such modifications and variations are to be included within the spirit and scope of this invention.

What is claimed is:

1. A hydrophobic polymeric resin shaped article having dispersed therein, in a minor amount effective to produce antistatic properties, a phosphate ester of the formula:

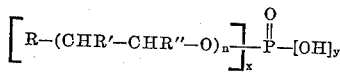

wherein R represents a member of the group consisting of a residue of an aliphatic alcohol of from 6 to 27 carbon atoms and a residue of an alkylater phenol containing from 1 to 36 alkyl carbon atoms; R' and R″ are each independently selected from a member of the group consisting of hydrogen and methyl; $n$ is an integer from 1 to 150; $x$ represents an integer of 1 to 3 and $y$ represents an integer of 0 to 2, the sum of $x$ and $y$ being 3.

2. An article as defined in claim 1 wherein the phosphate ester is a mixture of monoester, diester and triester of phosphoric acid.

3. An article as defined in claim 1 wherein the phosphate ester is a monoester of phosphoric acid.

4. An article as defined in claim 1 wherein the phosphate ester is a diester of phosphoric acid.

5. The hydrophobic polymeric resin shaped article of claim 1 wherein said phosphate ester is present in an amount of from 0.1 to 5.0 parts per hundred parts of resin.

6. The hydrophobic polymeric resin shaped article of claim 1 wherein R is a residue of nonylphenol, R' and R" are each hydrogen and n is at least 2.

7. The hydrophobic polymeric resin shaped article of claim 1 wherein R is a residue of laurylalcohol; R' and R" are each hydrogen and n is at least 4.

8. The hydrophobic polymeric resin shaped article of claim 1 wherein R is a residue of tridecyl alcohol; R' and R" are each hydrogen and n is at least 2.

9. A method of obtaining antistatic properties in a hydrophobic polymeric resin which comprises dispersing in the resin in a minor amount effective to produce antistatic properties a phosphate ester of the formula:

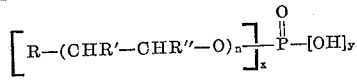

wherein R represents a member of the group consisting of a residue of an aliphatic alcohol of from 6 to 27 carbon atoms and a residue of an alkylated phenol containing from 1 to 36 alkyl carbon atoms; R' and R" are each independently selected from a member of the group consisting of hydrogen and methyl; $n$ is an integer from 1 to 150; $x$ represents an integer of 1 to 3 and $y$ represents an integer of 0 to 2, the sum of $x$ and $y$ being 3.

10. The method of claim 9 wherein said phosphate ester is present in an amount of from 0.1 to 5.0 parts per hundred parts of resin.

11. The method of claim 9 wherein R is a residue of nonylphenol; R' and R" are each hydrogen, and n is at least 2.

12. The method of claim 9 wherein R is a residue of tallow alcohol, R' and R" are each hydrogen, and n is at least 2.

13. A method as defined in claim 9 wherein the phosphate ester is a mixture of monoester, diester and triester of phosphoric acid.

14. A method as defined in claim 9 wherein the phosphate ester is a monoester of phosphoric acid.

15. A method as defined in claim 9 wherein the phosphate ester is a diester of phosphoric acid.

References Cited

UNITED STATES PATENTS

| | | | |
|---|---|---|---|
| 2,318,296 | 5/1943 | Dickey. | |
| 2,450,903 | 10/1948 | Mikeska | 106—177 XR |
| 2,464,784 | 3/1949 | Easton | 106—177 |
| 2,466,393 | 4/1949 | Dickey et al. | 106—177 |
| 2,498,408 | 2/1950 | Fox. | |
| 2,842,462 | 7/1958 | Haas et al. | 117—139.5 |
| 2,853,471 | 9/1958 | Beadell | 260—45.7 |
| 3,004,056 | 10/1961 | Nunn et al. | 260—950 |
| 3,004,057 | 10/1961 | Nunn et al. | 260—980 |
| 3,056,744 | 10/1962 | Copes et al. | 117—139.5 |
| 3,071,818 | 1/1963 | Miura et al. | |
| 3,092,651 | 6/1963 | Friedman | 106—177 XR |
| 3,139,450 | 6/1964 | Friedman | 106—177 XR |
| 3,145,187 | 8/1964 | Hankey et al. | 260—23 X |
| 3,170,877 | 2/1965 | Beiswanger et al. | 252—8.8 |
| 3,177,174 | 4/1965 | Tirpak | 260—21.6 X |
| 3,277,217 | 10/1966 | Nehmsmann et al. | 260—985 |

OTHER REFERENCES

American Dyestuff Reporter, pp. 368–371, "Antistatic Finishes for Textiles," by M. Hayak, June 1954.

"How to Make Plastics Static-Free," pts. 1 and 2, Plastic Technology, March 1963, pp. 38–41, and April 1963, pp. 47–51.

ALEXANDER H. BRODMERKEL, *Primary Examiner.*

ROBERT F. WHITE, *Examiner.*

J. H. WOO, *Assistant Examiner.*